March 1, 1932.  H. O. HEM  1,847,874
LINK
Filed July 3, 1926
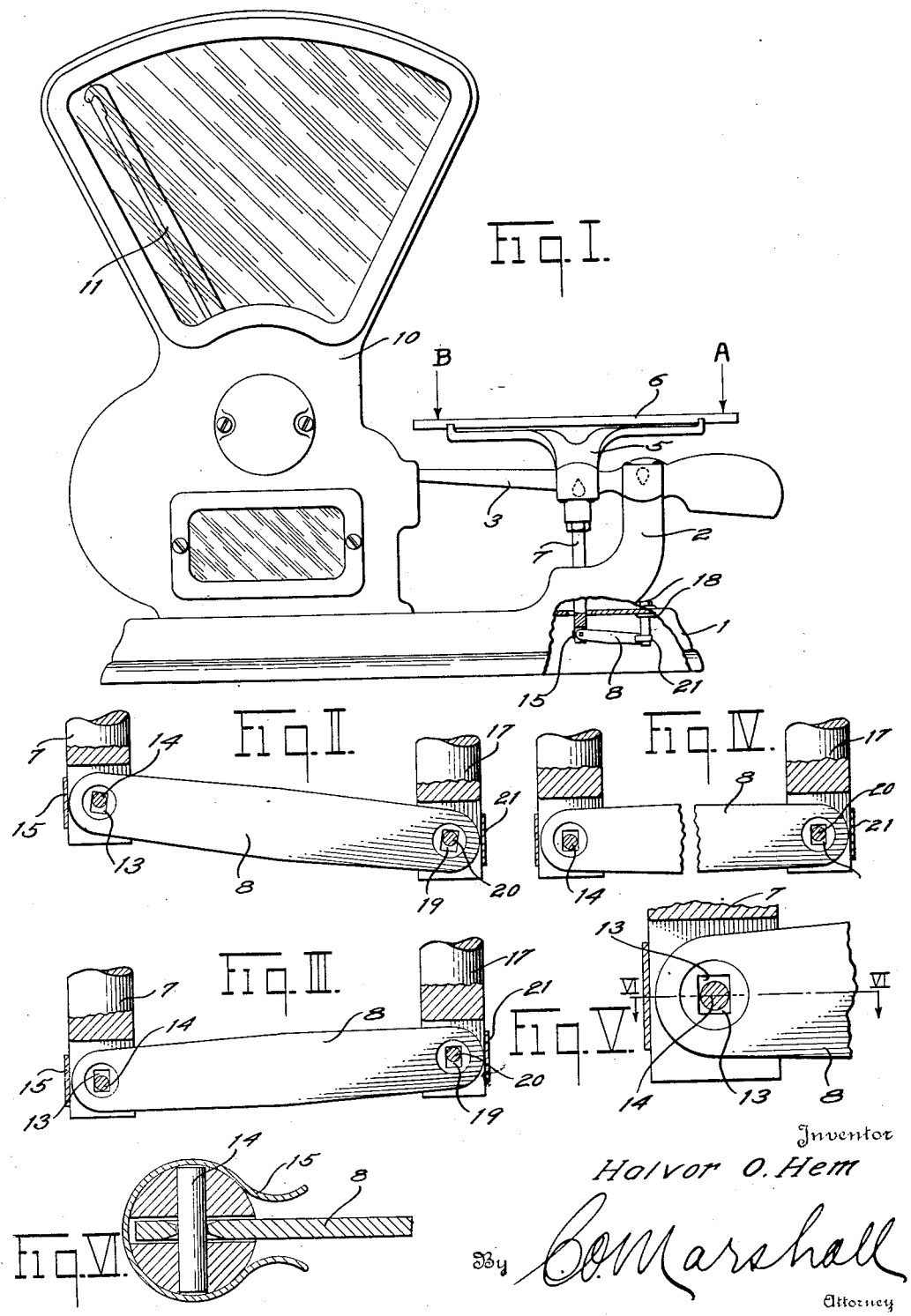
Inventor
Halvor O. Hem
By C. O. Marshall
Attorney Patented Mar. 1, 1932

1,847,874

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

LINK

Application filed July 3, 1926. Serial No. 120,271.

This invention relates to pivotal connections for use in weighing scales, and particularly to platform stabilizing means incorporating such pivotal connections, as incorporated in a counter scale of the fan type, but it is to be understood that the type of check link disclosed may be used in other types of scales and that the pivotal connection through which passes a cylindrical pin 20 substantially identical in construction with the pin 14, the pin 20 lying within a cylindrical opening in the post 17 and being retained in place by means of a resilient U-shaped clip 21.

The operation of the check link and pivotal connection is illustrated in Figures II to IV inclusive, which show the mechanism in three different positions. Figure II shows the position of the link when the scale is at zero—that is, when there is no load on the platform. In this condition of the weighing mechanism the link is under neither compression nor tension and the link by virtue of its own weight hangs upon the pins 14 and 20 which are engaged by the upper sides of the oblong openings 13 and 19. When there is no load upon the platform or when the platform is loaded substantially in its center, there is no tendency of the spider stem 7 to move toward or away from the shift post 17 and the link will ordinarily hang upon the pins 14 and 20 with the upper sides of the openings engaging the pins throughout weighing movements of the scale. When the platform is centrally loaded, therefore, the device operates substantially as though the pivotal connections were round pins in square holes. When the link is under neither tension nor compression there is no pressure on the pivots except the slight pressure caused by the weight of the link itself and the friction in this condition is negligible either in a check link of the form having round pins turning in square holes or the form illustrated and described herein, the pins in each form being in sliding contact with the openings in the link throughout weighing operations.

It is when a load is placed on one side or the other of the platform that pressure is put upon the pivotal connections of the check link. If, for example, the center of the load were five inches from the center of the platform and the spider stem 7 were five inches long, the pressure on the pivotal connection at each end of the link would be equal to the weight of the load. It is when the load is placed on one side or the other of the platform that trouble is caused by friction in check link mechanism of the usual type in which the pin has sliding engagement under great pressure with the wall of the opening in the check link through which it passes.

In the operation of the device of my invention, however, if the load be placed at the point A on the platform the pin 14 will be pressed against the left side of the opening 13 and the pin 20 against the right side of the opening 19. As the platform descends under load the pin 14 will roll along the side of the opening against which it is pressed to the position in which it is shown in Figure III. The pin 20 will in the meantime tend to roll upwardly in the opening 19, but, being prevented by the upper side of the opening with which it was in contact at the beginning of the downward movement from rolling upwardly, it will slidingly engage the top and right side of the opening 20 during the downward movement. Owing, however, to the fact that the downward movement of a weighing scale always carries the mechanism beyond the position of balance, the stem 7 will move downwardly beyond its true weighing position and then move upwardly for a part of the distance through which it has just descended. During this upward movement the pin 14 will roll upwardly along the left side of the opening 13 a short distance, but it will not again come into engagement with the upper end of the opening. The pin 20 during the retrograde movement of the weighing mechanism will roll downwardly along the right side of the opening 19, thus moving out of engagement with the upper side of the opening so that when the scale reaches balanced position the pins 14 and 20 will both be in rolling engagement with the sides of their respective openings. It is understood, of course, that the diameter of the pin is slightly less than the width of the opening, so that it can engage only one side of the opening at a time.

When a load is placed at B on the platform the operation is similar to that just described except that the pins engage the inner instead of the outer sides of the openings. The effective length of the check link in all conditions of its operation—viz., when the load is at the center of the platform or on either side—is substantially the same because it turns about axes at the centers of the two pins.

It should be clear from the description of the illustrated embodiment of the invention that the mode of operation of the pivotal connection will be substantially the same whether the link or other member which is provided with it extends horizontally or vertically or whether the opening is in the link and the pins on the members to which the link is connected, or vice versa.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, in weighing mechanism, a substantially horizontally extending link, said link having openings oblong in a direction transverse to the length of the link and adjacent its ends, and elements adapted to be pivotally connected to said link, said elements having pins adapted to be received in said openings, the parts being so constructed and arranged as to provide a limited rolling engagement between the pins and walls of said openings.

2. In weighing mechanism, in combination, an element having a kerf, a link having one end received in said kerf, said element having a cylindrical opening and said link having an opening in its end, a cylindrical pin lying within the cylindrical opening in said element and passing through the opening in said link, and a U-shaped clip embracing said element and covering the ends of the cylindrical opening therein.

3. In weighing mechanism, in combination, an element having a kerf, a link having one end received in said kerf, said element having a cylindrical opening and said link having an opening in its end said opening being oblong in a direction transverse to the length of the link, a cylindrical pin lying within the cylindrical opening in said element and passing through the oblong opening in said link, and a U-shaped member embracing said element and covering the ends of the cylindrical opening therein.

4. In a device of the class described, in combination, in weighing mechanism, two laterally spaced members, one of which is adapted to move substantially vertically relative to the other, round pivots fixed to each of said members, and a connecting link extending nearly horizontally between said members, said connecting link having at each end an opening receiving one of said round pivots, the horizontal dimensions of said opening being only slightly greater than the diameter of the round member received by it while the vertical dimension of said opening is enough greater to permit rolling contact between said round pivot and one of the vertical sides of said opening.

HALVOR O. HEM.